(12) United States Patent
Juzak et al.

(10) Patent No.: US 9,518,684 B2
(45) Date of Patent: Dec. 13, 2016

(54) PIPE CLIP WITH LOCKING FEATURE

(71) Applicant: J. van Walraven Holding B.V., Mijdrecht (NL)

(72) Inventors: Marek Juzak, Mijdrecht (NL); Frank Nijdam, Zeewolde (NL)

(73) Assignee: J. van Walraven Holding B.V., Mijdrecht (NL)

( * ) Notice: Subject to any disclaimer, the term of this patent is extended or adjusted under 35 U.S.C. 154(b) by 0 days.

(21) Appl. No.: 14/892,611

(22) PCT Filed: Jul. 7, 2014

(86) PCT No.: PCT/NL2014/050453
§ 371 (c)(1),
(2) Date: Nov. 20, 2015

(87) PCT Pub. No.: WO2015/009141
PCT Pub. Date: Jan. 22, 2015

(65) Prior Publication Data
US 2016/0131281 A1 May 12, 2016

(30) Foreign Application Priority Data
Jul. 18, 2013 (NL) ...................................... 2011194

(51) Int. Cl.
*F16L 3/08* (2006.01)
*F16L 3/12* (2006.01)
(Continued)

(52) U.S. Cl.
CPC .............. *F16L 3/1083* (2013.01); *F16B 35/06* (2013.01); *F16B 37/0842* (2013.01);
(Continued)

(58) Field of Classification Search
CPC ...... F16L 3/1083; F16L 3/1075; F16L 3/1008; F16B 35/06; F16B 37/02
See application file for complete search history.

(56) References Cited

U.S. PATENT DOCUMENTS 4,281,863 A * 8/1981 Hall .................... F01N 13/1805
24/279
4,373,235 A * 2/1983 Korgaonkar ............ F16L 23/04
24/282

(Continued)

FOREIGN PATENT DOCUMENTS

DE          4039260 A1    6/1992
DE     102007025191 A1   12/2008
(Continued)

*Primary Examiner* — Amy Sterling
(74) *Attorney, Agent, or Firm* — Hoffmann & Baron, LLP

(57) ABSTRACT

A pipe clip for fastening a pipe to a support structure includes an annular pipe clip body for surrounding the pipe to be fastened. The pipe clip body has a first and a second flange which in use are pulled towards each other by a male fastening element having a head and a shank. The second flange is associated with a female fastener via which the male fastening element is connected to the second flange. The first flange has a longitudinal slot which has an open end opposing the closed end, the open end opening up in an edge of the first flange for introducing the shank of the male fastening element into the slot. The first flange has an upstanding collar portion around the closed end of the cutout.

3 Claims, 4 Drawing Sheets

(51) Int. Cl.
*F16L 3/10* (2006.01)
*F16B 35/06* (2006.01)
*F16L 55/035* (2006.01)
*F16B 41/00* (2006.01)
F16B 37/02 (2006.01)
F16B 37/08 (2006.01)

(52) U.S. Cl.
CPC .......... *F16B 41/002* (2013.01); *F16L 3/1008* (2013.01); *F16L 55/035* (2013.01); *F16B 37/02* (2013.01); *F16B 37/0857* (2013.01)

(56) References Cited

U.S. PATENT DOCUMENTS

| | | | | |
|---|---|---|---|---|
| 4,915,418 | A * | 4/1990 | Palatchy | F16L 17/04 24/284 |
| 5,018,768 | A * | 5/1991 | Palatchy | F16L 17/04 24/284 |
| 5,570,499 | A * | 11/1996 | Katayama | F16B 41/002 24/279 |
| 6,464,268 | B1 * | 10/2002 | Hough | F16L 23/08 285/367 |

FOREIGN PATENT DOCUMENTS

| | | |
|---|---|---|
| DE | 202011050584 U1 | 12/2011 |
| EP | 0188649 A1 | 7/1986 |
| EP | 1384928 A1 | 1/2004 |
| EP | 1845295 A1 | 10/2007 |
| WO | 2012/134278 A1 | 10/2012 |

* cited by examiner

PIPE CLIP WITH LOCKING FEATURE

CROSS-REFERENCE TO RELATED APPLICATIONS

This application is the National Stage of International Application No. PCT/NL2014/050453 filed Jul. 7, 2014, which claims the benefit of Netherlands Application No. NL 2011194, filed Jul. 18, 2013, the contents of which is incorporated by reference herein.

FIELD OF THE INVENTION

The present invention relates to a pipe clip for fastening a pipe to a wall, ceiling or other support structure, the pipe clip comprising a substantially annular pipe clip body which in use surrounds the pipe to be fastened and has a first and a second flange which in use are pulled towards each other by means of a male fastening element having a head and having a shank extending from an underside of the head, wherein the second flange is associated with a female fastening means via which the male fastening element is connected to the second flange, and wherein the first flange has a cutout with at least one closed end at which the shank is received in a mounted state, the first flange having an upstanding collar portion arranged at said closed end of the cutout, and the head of the male fastening element having a circular groove in its underside, said groove being engageable with the collar portion so as to mutually lock the head and the first flange in position at said closed end.

BACKGROUND OF THE INVENTION

EP 0188649 A1 discloses a pipe clip which has a pivoting nut arranged at the second flange, which nut cooperates with the shank of a tightening screw. Furthermore the known pipe clip has an open ended slot in the first flange. The slot opens up at the radially remote end edge of the flange. When such a pipe clip is mounted, the tightening screw can pivot such that the head of the screw can move beyond the edge of the first flange and the shank of the screw can be introduced in the open ended slot in the first flange.

The pipe clips having an open ended slot in the first flange have as a disadvantage that when heavy loads are to be carried by the pipe clip, the flange portions adjacent the slot will be pulled from underneath the head of the male fastening element (screw) after which the fixation is lost.

EP 1845295 A1 discloses a pipe clip in which a screw is tiltably connected to a second flange. The pipe clip has a first flange having a slot which is open on one end at the end of the flange. At the end of the flange there is an inclined flange portion. The inclined flange portion prevents the screw head from shifting towards the flange edge, whereby the screw would become disengaged from the flange.

Another pipe clip is known from EP 1384928 A1. In this known pipe clip a tightening screw is screwed in threaded hole in the second flange. The first flange has an open ended slot which extends substantially in the axial direction of the pipe to be mounted. The open ended slot opens up in a lateral edge of the first flange.

A disadvantage, which is common for pipe clips with a slot in the first flange that opens up in the lateral edge, is that the pipe clip in a temporary attachment between the first flange and the second flange of the pipe clip hold the pipe, but usually is moved in the axial direction over the pipe to bring it in its final position. In the final position the tightening screw can be tightened and the pipe clip is tightened around the pipe. During movement of the pipe clip along the pipe, the flanges of the pipe clip can swivel away from each other and the screw shank can escape from the slot and the temporary attachment is lost. EP 1384928 shows a solution that provides a retaining means that is separately manufactured and afterwards mounted on the flange to retain a screw shank in the slot.

DE 40 39 260 A1 discloses a pipe clip with a second flange having a threaded bore cooperating with a threaded shank of a tightening screw. The pipe clip has a first flange with two adjoining bores. A larger bore thereof has a dimension such that the head of the screw can pass through it. A smaller bore thereof has a smaller dimension than the diameter of the head. In a mounted state the shank extends through the smaller bore and the head engages the flange portion adjacent the smaller bore. The flange is provided with a collar at the smaller bore. The head of the screw is provided with a groove. When the screw is tightened the groove grips around the collar and prevents a mutual radial shifting of the pipe clip halves.

The invention has for an object to provide an improved pipe clip.

SUMMARY OF THE INVENTION

This object is achieved by a pipe clip of the type mentioned at the outset, wherein the cutout is a longitudinal slot which has an open end opposing the closed end, said open end opening up in an edge of the first flange for introducing the shank of the male fastening element into the slot, wherein the first flange adjacent the slot has an inclined end portion with respect to the plane of the second flange, which inclined end portion is bent away from the second flange, and wherein the inclined end portion is such that the head of the male fastening element is guided towards the end portion of the slot and towards the upper surface of the first flange and with the head over the collar portion, such that the collar portion is received in the groove in the head.

The collar portion that is provided at the end of the recess provides a locking arrangement for the head of the screw that has a groove to cooperate with the collar portion. The screw shank is thus prevented from escaping from the recess. The locking arrangement is stronger than with known solutions. Upon insertion of the shank of the screw in the recess the head slides along the inclined end portion of the flange. Thus the head of the screw is guided by the inclined surface towards the surface of the flange at the closed end of the recess. The screw head is guided such that the groove grips over the collar, whereby the screw head and the flange are mutually locked in a direction parallel to the flange surface. The inclined guiding surface provides a more comfortable and reliable closing of the pipe clip.

In a possible embodiment the collar portion is monolithically formed with the first flange. Forming the collar portion monolithically with the flange is no real additional burden in terms of manufacturing. No additional separate parts have to be manufactured and afterwards mounted to the flange. The monolithical collar portion provides additional stiffness to the first flange, such that deformation of the flange portions due to loads is prevented.

In a possible embodiment the collar portion has a circle segment shape. Preferably a half circular collar is provided at a rounded closed end portion of the cutout, because the collar is then easily manufactured.

The invention also relates to a pipe clip for fastening a pipe to a wall, ceiling or other support structure, the pipe clip comprising a substantially annular pipe clip body which in use surrounds the pipe to be fastened and has a first and a second flange which in use are pulled towards each other by means of a male fastening element having a head and having a shank extending from an underside of the head, wherein the second flange is associated with a female fastening means via which the male fastening element is connected to the second flange, and wherein the first flange has a cutout with at least one closed end at which the shank is received in a mounted state, wherein the first flange has an upstanding collar portion arranged at said closed end of the cutout, and in that the head of the male fastening element has a circular groove in its underside, said groove being engageable with the collar portion so as to mutually lock the head and the first flange in position at said closed end.

In a preferred embodiment of this pipe clip the cutout in the first flange is an opening with a closed contour, said opening having a first portion with a diameter exceeding the diameter of the screw head, such that the head can be inserted through said portion, and a second portion adjoining the first portion, which second portion has a smaller diameter which exceeds the diameter of the shank, but is smaller than the diameter of the head, and wherein the collar portion is arranged around the second portion of the opening.

In another preferred embodiment of this pipe clip the collar portion has a circle segment shape.

In yet another preferred embodiment of this pipe clip the collar portion is monolithically formed with the first flange.

The invention will be described in further detail in the following description with reference to the drawings.

DETAILED DESCRIPTION OF THE INVENTION

Figure 1:
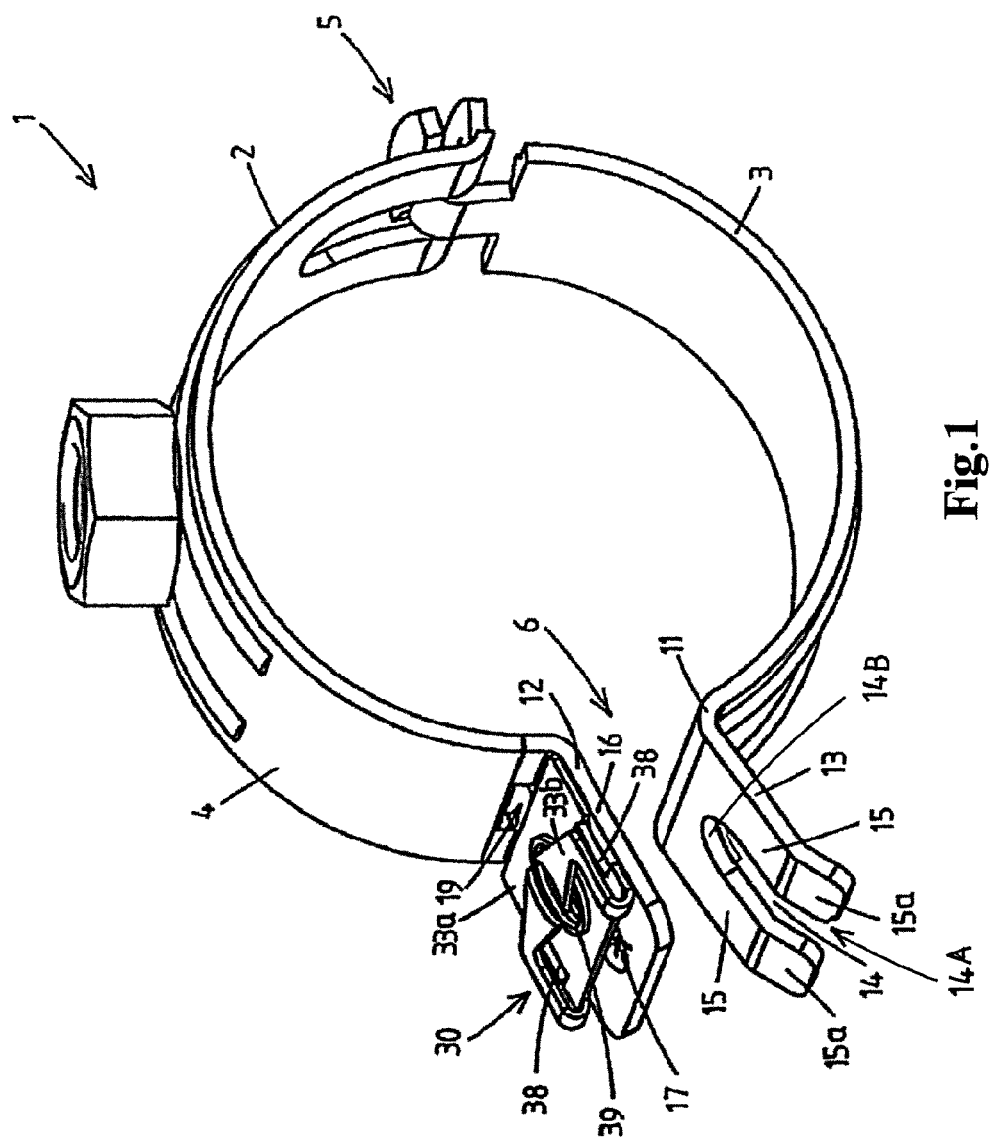
FIG. 1 shows in a view in perspective a pipe clip according to the invention.
Figure 2:
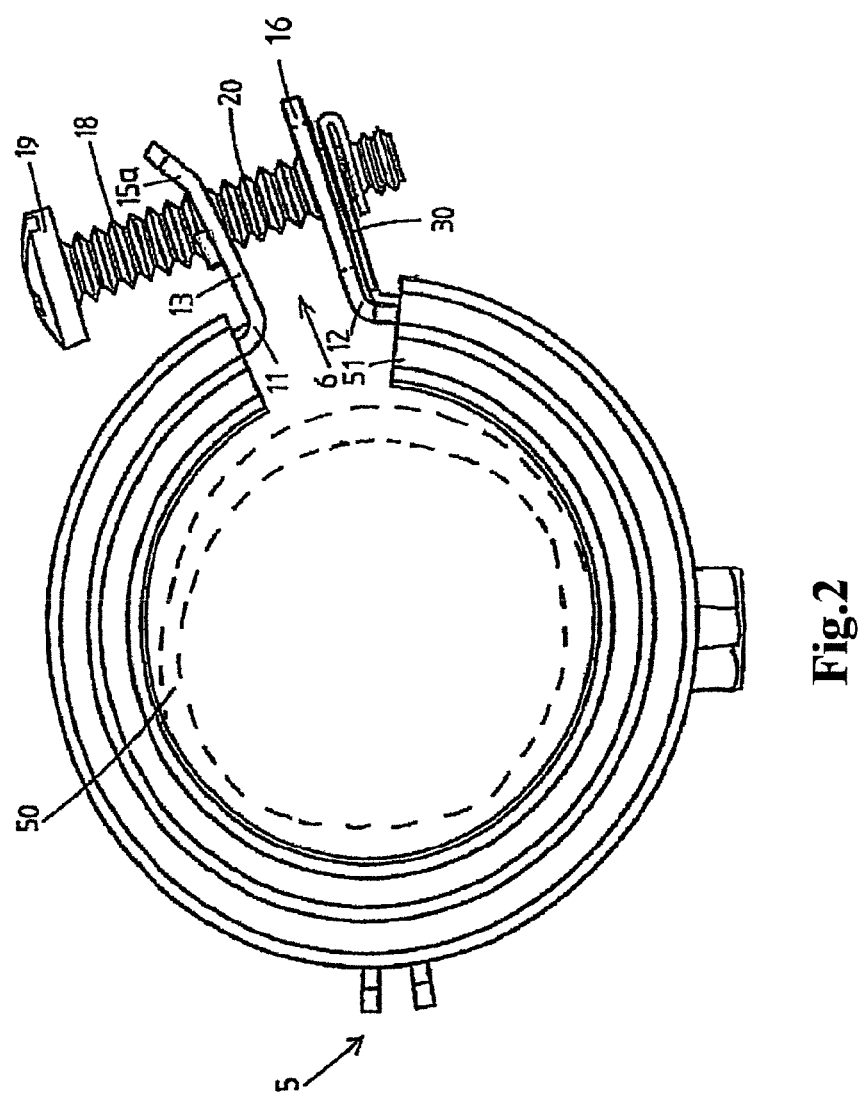
FIG. 2 shows a side elevational view of the pipe clip of FIG. 1, with a vibration isolating insert.

FIGS. 1 and 2 show a pipe clamp 1 with a clamp body 2 comprising two clamp halves 3 and 4, respectively, which are hingedly connected to one another by means of a hinge structure 5. The clamp body 2 has a first end 11 and a second end 12 which delimit an opening 6 for arranging the pipe clamp 1 around a pipe 50 (see FIG. 1). The opening 6 may be increased or reduced in size by pivoting the clamp halves 3 and 4 apart or towards one another. As is shown in FIG. 2, a vibration-absorbing insert 51 may be disposed on the inside of the clamp body. This insert 51 is preferably made of an elastomer, for example rubber, or another elastic material and has a substantially C-shaped cross section. The insert grips around the metal clamp body 2 together with the flanges of the C shape.

A first flange 13 is integrally formed on the first end 11, and a second flange 16 is integrally formed on the second end 12.

The first flange 13 has a slotted opening 14 which is open on the side of the flange which is remote from the clamp body 2. The end portion of the flange 13 is inclined. In this manner, two lips 15 are produced, wherein the inclined free ends 15a of the lips 15 are slightly bent into a direction which is turned away from the second flange 16.

In the second flange 16, an elongate opening 17 is disposed which, in contrast with the opening 14 in the first flange 13, is enclosed on all sides by the second flange 16. On the second flange 16, a spring nut 30, in the exemplary embodiment shown in FIG. 1, made of spring steel, is arranged in order to cooperate with a shank of a male fastening element so as to keep the pipe clamp 1 closed.

In order to close the pipe clamp 1 and to keep it closed, it comprises a male fastening element, in particular a tightening screw 18.

Figure 4:
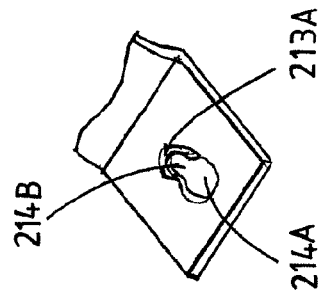
FIG. 4 shows a sectional view of the screw of FIG. 3.
Figure 3:
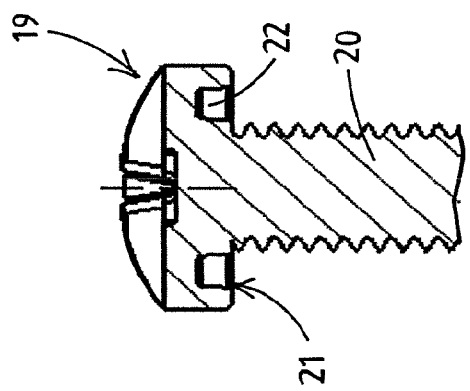
FIG. 3 shows in a view in perspective from below a screw used in a pipe clip of FIG. 1.

The tightening screw 18, which is shown separately in FIGS. 3 and 4 has a head 19 and a shank 20 which, in the example illustrated, is provided with external screw thread. The head 19 has an underside 21 which in use is facing the first flange 13. The underside 21 of the head 19 is provided with a circular groove 22.

Figure 5:
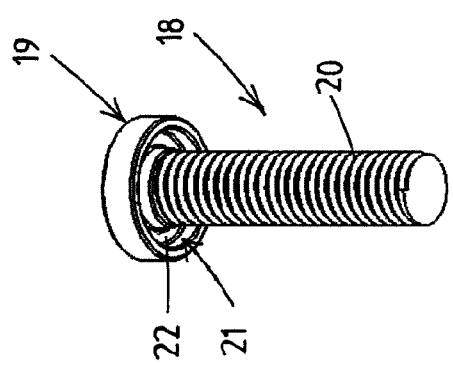
FIG. 5 shows in a view in perspective a flange of the pipe clip of FIG. 1.

In FIG. 5 the first flange 13 is shown in more detail. As can be seen the first flange 13 has a longitudinal slot 14 which has an open end 14A at the edge of the first flange 13 remote from the annular clip body 2. At its opposite end the slot 14 furthermore has a closed end portion 14B. At the closed end 14B of the slot a collar portion 13A is formed. In the example the collar portion 13A has a half circular shape.

Figure 6:
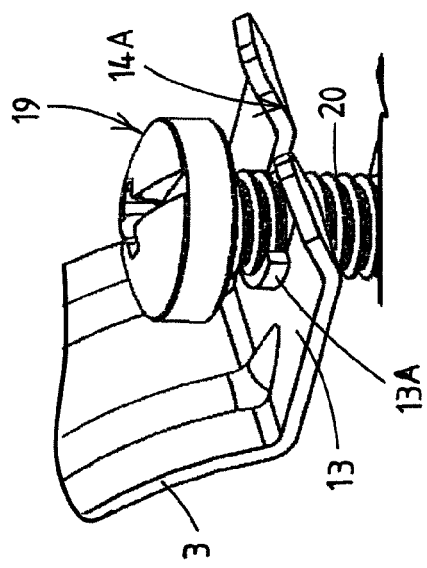
FIG. 6 shows in a view in perspective the flange of FIG. 5 with a screw in the slot during mounting.
Figure 8:
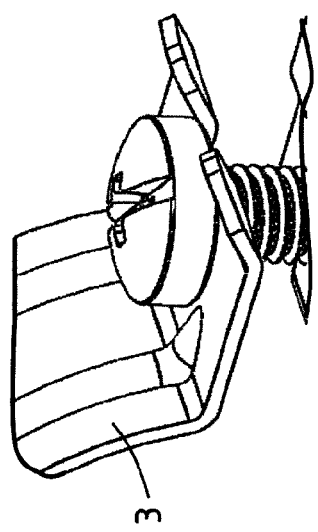
FIG. 8 shows in a view in perspective the flange of FIG. 5 in collaboration with a screw.
Figure 7:
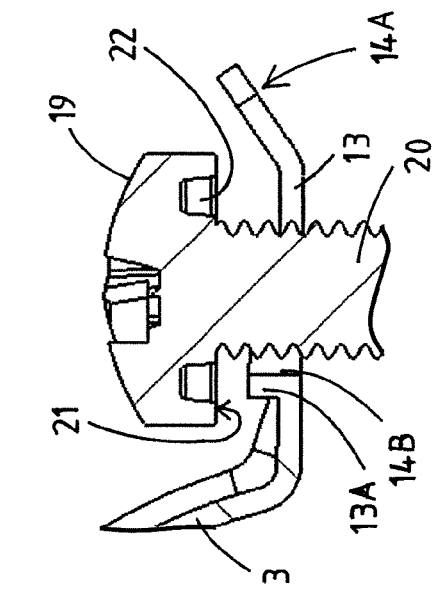
FIG. 7 shows in a sectional view the flange of FIG. 5 with a screw in the slot during mounting.
Figure 9:
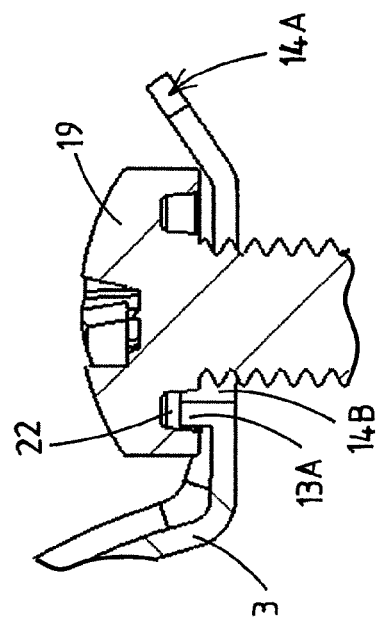
FIG. 9 shows in a sectional view the flange of FIG. 5 in collaboration with a screw.

The collar portion 13A on the first flange 13 fits in the groove 22 in the head 19 of the screw 18. In use the shank 20 of the screw 18 is inserted in the slot 14, and the shank 20 is moved towards the closed end 14B of the slot 14 (see FIGS. 6 and 7). The head 19 with the groove 22 is now located above the collar portion 13A as can be seen in FIGS. 6 and 7. When the head 19 is moved towards the upper surface of the first flange 13, as is shown in FIGS. 8 and 9 the collar portion 13A will be received in the groove 22 in the head 19 of the screw 18. Thereby the head of the screw is locked with respect to the first flange 13 in a direction parallel to the upper surface of the first flange 13. Thus the screw shank 20 moving out of the slot 14 is inhibited.

Figure 10:
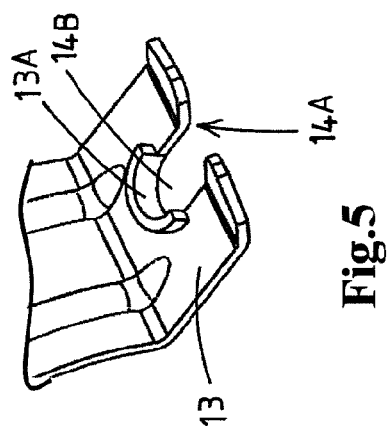
FIG. 10 shows in a view in perspective another embodiment of a flange for a pipe clip according to the invention.

In FIG. 10 another possible embodiment is illustrated. In this embodiment, the first flange 113 has a transversal slot 114 instead of a longitudinal slot 14. The slot 114 extends in a direction essentially parallel to the axial direction of a pipe received in the pipe clip and opens up in a lateral edge of the first flange 113. This slot 114 has a closed end where a collar portion 113A is provided, which has the same function as the collar portion 13A in the embodiment of FIGS. 5-9.

In the embodiments shown in the figures, the collar portion 13A, 113A is formed as a half circular upstanding edge portion, which is monolithically formed with the first flange 13, 113. It is however also conceivable to provide upstanding protrusions of another shape. For example a plurality of upstanding lugs arranged in a circular configuration would be possible. It is to be understood that such equivalent protrusions are deemed to fall within the term "collar portion" as used herein.

Also it is possible to attach the collar portion or other equivalent protrusions to the flange instead of integrally forming the collar portion with the flange for example by means of welding or an adhesive.

Figure 11:
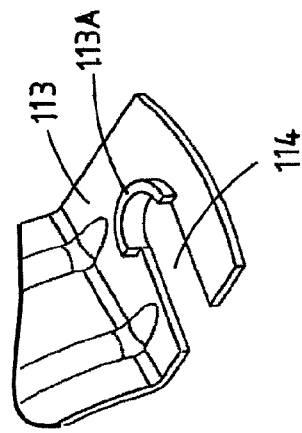
FIG. 11 shows in a view in perspective yet another embodiment of a flange for a pipe clip according to the invention.

Also it is noted that the embodiments in the figures show a slot 14, 114 in the first flange 13, 113 which are open on one end. However, it is also conceivable that the first flange has a cutout in it with a closed contour as is shown in FIG. 11. The cutout has typically two adjacent portions 214A and 214B, being a larger and a smaller portion. The larger portion 214A has a diameter exceeding the diameter of the screw head 19, such that the head 19 can be inserted through said larger portion 214A. The smaller portion 214B of the cutout has a smaller diameter which exceeds the diameter of the shank 20, but is smaller than the diameter of the head 19. In a mounted state the head 19 of the screw can rest on the edge around the smaller portion 214B. In accordance with the invention the edge around the smaller portion 214 of the cutout can include a collar portion 213A comparable to the ones 13A, 113A described in the above embodiments. In use the head 19 of the screw is inserted through the larger opening portion 214A in the first flange. Next, the screw shank 20 can be moved from the larger portion 214A to the smaller portion 214B of the cutout. When the head 19 with the groove 22 is located above the collar portion 213A and the screw head 19 is moved towards the upper surface of the first flange, the collar portion will be received in the groove 22 in the head 19 of the screw.

It is noted that throughout the above description it is mentioned that the groove in the head of the male fastening element is circular. Strictly this circular shape is not necessary for a functioning design in which the head is locked at the flange by a collar portion, as long as the collar portion can be received in the groove. However, from a practical point of view the circular shape of the groove is preferred, since it makes the head rotationally symmetric, which is advantageous in handling.

The invention claimed is:

1. A pipe clip for fastening a pipe to a wall, ceiling or other support structure, the pipe clip comprising:
    a substantially annular pipe clip body which in use surrounds the pipe to be fastened and has a first and a second flange which in use are pulled towards each other by means of a male fastening element having a head and having a shank extending from an underside of the head, wherein the second flange is associated with a female fastening means via which the male fastening element is connected to the second flange, and wherein the first flange has a cutout with at least one closed end at which the shank is received in a mounted state, the first flange having an upstanding collar portion arranged at said closed end of the cutout, and the head of the male fastening element having a circular groove in its underside, said groove being engageable with the collar portion so as to mutually lock the head and the first flange in position at said closed end,
    wherein the cutout is a longitudinal slot which has an open end opposing said closed end, said open end opening up in an edge of the first flange for introducing the shank of the male fastening element into the slot,
    wherein the first flange adjacent the slot has an inclined end portion with respect to the plane of the second flange, which inclined end portion is bent away from the second flange, and
    wherein the inclined end portion is such that the head of the male fastening element is guided towards the end portion of the slot and towards the upper surface of the first flange and with the head over the collar portion, such that the collar portion is received in the groove in the head.

2. The pipe clip according to claim 1, wherein the collar portion has a circle segment shape.

3. The pipe clip according to claim 1, wherein the collar portion is monolithically formed with the first flange.

* * * * *